(12) United States Patent
Ishizeki et al.

(10) Patent No.: US 10,500,920 B2
(45) Date of Patent: Dec. 10, 2019

(54) VEHICLE AIR CONDITIONER

(71) Applicant: SANDEN AUTOMOTIVE CLIMATE SYSTEMS CORPORATION, Isesaki-shi, Gunma (JP)

(72) Inventors: Tetsuya Ishizeki, Isesaki (JP); Ryo Miyakoshi, Isesaki (JP); Kohei Yamashita, Isesaki (JP)

(73) Assignee: Sanden Automotive Climate Systems Corporation, Isesaki-shi, Gunma (JP)

( * ) Notice: Subject to any disclaimer, the term of this patent is extended or adjusted under 35 U.S.C. 154(b) by 21 days.

(21) Appl. No.: 16/061,970

(22) PCT Filed: Dec. 6, 2016

(86) PCT No.: PCT/JP2016/086835
§ 371 (c)(1),
(2) Date: Jun. 13, 2018

(87) PCT Pub. No.: WO2017/104588
PCT Pub. Date: Jun. 22, 2017

(65) Prior Publication Data
US 2018/0370329 A1    Dec. 27, 2018

(30) Foreign Application Priority Data
Dec. 14, 2015    (JP) ................. 2015-243402

(51) Int. Cl.
*B60H 1/00* (2006.01)
*B60H 1/22* (2006.01)
(Continued)

(52) U.S. Cl.
CPC ..... *B60H 1/00914* (2013.01); *B60H 1/00007* (2013.01); *B60H 1/00735* (2013.01);
(Continued)

(58) Field of Classification Search
CPC ............ B60C 1/00035; B60C 1/00921; B60C 1/00914; B60C 1/00007; B60C 1/00735;
(Continued)

(56) References Cited

U.S. PATENT DOCUMENTS

| | | | |
|---|---|---|---|
| 2016/0084554 A1* | 3/2016 | Suzuki | F25B 47/022 62/160 |
| 2016/0185185 A1* | 6/2016 | Suzuki | B60H 1/00921 237/5 |
| 2017/0274725 A1* | 9/2017 | Miyakoshi | B60H 1/00035 |

FOREIGN PATENT DOCUMENTS

| | | |
|---|---|---|
| JP | 2014-213765 A | 11/2014 |
| JP | 2015-205563 A | 11/2015 |

OTHER PUBLICATIONS

Japan Patent Office, International Search Report issued in International Application No. PCT/JP2016/086835, dated Feb. 14, 2017.

* cited by examiner

*Primary Examiner* — Davis D Hwu
(74) *Attorney, Agent, or Firm* — Baker Botts L.L.P.

(57) ABSTRACT

There is provided a vehicle air conditioner which is capable of smoothly achieving a dehumidifying and heating mode without using an evaporation pressure adjustment valve, so that cost reduction is achievable. A controller executes a normal mode to control an operation of a compressor 2 on the basis of a radiator pressure PCI and control a valve position of an outdoor expansion valve 6 on the basis of a heat absorber temperature Te, and in this normal mode, when the valve position of the outdoor expansion valve 6 is maximized but the heat absorber temperature Te falls, the controller shifts to a heat absorber temperature control mode to control the operation of the compressor 2 on the basis of the temperature of a heat absorber 9 and generate heat from an auxiliary heater 23.

8 Claims, 7 Drawing Sheets

(51) Int. Cl.
*B60H 3/02* (2006.01)
*B60H 1/32* (2006.01)
(52) U.S. Cl.
CPC ........... *B60H 1/00885* (2013.01); *B60H 1/22* (2013.01); *B60H 3/024* (2013.01); *B60H 2001/0015* (2013.01); *B60H 2001/3272* (2013.01)
(58) Field of Classification Search
CPC ....... B60C 1/00885; B60C 1/22; B60C 3/024; B60C 2001/0015; B60C 1/3272; F25B 7/022
USPC .......................................................... 165/202
See application file for complete search history.

VEHICLE AIR CONDITIONER

CROSS-REFERENCE TO RELATED APPLICATIONS

This application is a U.S. National Stage Patent Application under 37 U.S.C. § 371 of International Patent Application No. PCT/JP2016/086835, filed on Dec. 6, 2016, which claims the benefit of Japanese Patent Application No. JP 2015-243402, filed on Dec. 14, 2015, the disclosures of which are incorporated herein by reference in their entirety.

TECHNICAL FIELD

The present invention relates to an air conditioner of a heat pump system which conditions air of a vehicle interior, and more particularly, it relates to a vehicle air conditioner which is suitable for a hybrid car and an electric vehicle.

BACKGROUND ART

Due to actualization of environmental problems in recent years, hybrid cars and electric vehicles have spread. Then, as an air conditioner which is applicable to such a vehicle, there has been developed an air conditioner including a compressor to compress and discharge a refrigerant, a radiator disposed on the side of a vehicle interior to let the refrigerant radiate heat, a heat absorber disposed on the vehicle interior side to let the refrigerant absorb heat, and an outdoor heat exchanger disposed outside the vehicle interior to let the refrigerant radiate heat or absorb heat, and there are changeable a heating mode to let the refrigerant discharged from the compressor radiate heat in the radiator and let the refrigerant from which the heat has been radiated in this radiator absorb heat in the outdoor heat exchanger, a dehumidifying and heating mode to let the refrigerant discharged from the compressor radiate heat in the radiator and let the refrigerant from which the heat has been radiated in the radiator absorb heat in the heat absorber and the outdoor heat exchanger, a dehumidifying and cooling mode to let the refrigerant discharged from the compressor radiate heat in the radiator and the outdoor heat exchanger and let the refrigerant absorb heat in the heat absorber, and a cooling mode to let the refrigerant discharged from the compressor radiate heat in the outdoor heat exchanger and let the refrigerant absorb heat in the heat absorber (e.g., see Patent Document 1).

In this case, an outdoor expansion valve is disposed in an inlet of the outdoor heat exchanger, and an indoor expansion valve is disposed in an inlet of the heat absorber. Furthermore, a bypass circuit is disposed in parallel with a series circuit of the outdoor expansion valve and the outdoor heat exchanger. Then, in the above-mentioned dehumidifying and heating mode, the refrigerant flowing through the radiator is distributed, a part of the refrigerant flows from the bypass circuit through the indoor expansion valve in which the refrigerant is decompressed, and then flows into the heat absorber to absorb heat. Furthermore, the residual refrigerant flows through the outdoor expansion valve in which the refrigerant is decompressed, and then flow into the outdoor heat exchanger to absorb heat.

Additionally, in such a dehumidifying and heating mode, an operation of the compressor is controlled on the basis of a radiator pressure to control a heating capability by the radiator, and the outdoor expansion valve is controlled on the basis of a temperature of the heat absorber to control a dehumidifying capability (a cooling capability) by the heat absorber. Specifically, when the temperature of the heat absorber is lower than a target heat absorber temperature, a valve position of the outdoor expansion valve is expanded to decrease an amount of the refrigerant to flow from the bypass circuit to the heat absorber, and conversely, when the temperature of the heat absorber is higher, the valve position of the outdoor expansion valve is reduced to increase an amount of the refrigerant to flow into the heat absorber from the bypass circuit through the indoor expansion valve.

CITATION LIST

Patent Documents

Patent Document 1: Japanese Patent Application Publication No. 2014-213765

SUMMARY OF THE INVENTION

Problems to be Solved by the Invention

As described above, a temperature of a heat absorber in a dehumidifying and heating mode is controlled in accordance with a valve position of an outdoor expansion valve. Therefore, for example, even when the outdoor expansion valve is expanded to its maximum position in an environment where an outdoor air temperature falls, the temperature of the heat absorber falls below a target heat absorber temperature, and hence, there is the risk that an outlet temperature of air to be blown to a vehicle interior falls. To eliminate such a risk, in Patent Document 1 described above, an evaporation pressure adjustment valve (referred to as an evaporation capability control valve in Patent Document 1) is attached to a refrigerant outlet side of the heat absorber, and in such a situation, this evaporation pressure adjustment valve is opened and closed to decrease an amount of a refrigerant to flow into the heat absorber. However, this evaporation pressure adjustment valve has the defect that the valve is comparatively expensive, and is required to improve.

The present invention has been developed to solve such conventional technical problems, and an object thereof is to provide a vehicle air conditioner which is capable of smoothly achieving a dehumidifying and heating mode without using an evaporation pressure adjustment valve, so that cost reduction is achievable.

Means for Solving the Problems

A vehicle air conditioner of the invention includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior to let the refrigerant absorb heat, an outdoor expansion valve to decompress the refrigerant flowing into this outdoor heat exchanger, a bypass circuit connected in parallel with a series circuit of the outdoor heat exchanger and the outdoor expansion valve, an indoor expansion valve to decompress the refrigerant flowing into the heat absorber, an auxiliary heating device to heat the air to be supplied from the air flow passage to the vehicle interior, and a control device, so that this control device lets the refrigerant discharged from the compressor radiate heat in the radiator, distributes the refrigerant from which the heat has been radiated, lets a part of the refrigerant flow into the heat absorber from the bypass circuit through the indoor expansion valve, lets the refrigerant absorb heat in the heat absorber, lets the residual refrigerant flow into the outdoor heat exchanger through the outdoor expansion valve, and lets the refrigerant absorb heat in the outdoor heat exchanger to execute dehumidifying and heating of the vehicle interior, and the vehicle air conditioner is characterized in that the control device executes a normal mode to control an operation of the compressor on the basis of a pressure of the radiator and control a valve position of the outdoor expansion valve on the basis of a temperature of the heat absorber, and in this normal mode, when the valve position of the outdoor expansion valve is maximized but the temperature of the heat absorber falls, the control device shifts to a heat absorber temperature control mode to control the operation of the compressor on the basis of the temperature of the heat absorber and generate heat from the auxiliary heating device.

The vehicle air conditioner of the invention of claim 2 is characterized in that in the above invention, the control device shifts to the heat absorber temperature control mode, when the temperature of the heat absorber falls below a predetermined temperature in a state where the valve position of the outdoor expansion valve is maximized in the normal mode.

The vehicle air conditioner of the invention of claim 3 is characterized in that in the above invention, in the normal mode, the control device controls the operation of the compressor on the basis of a radiator pressure PCI that is the pressure of the radiator and a target radiator pressure PCO that is a target value of the pressure, controls the valve position of the outdoor expansion valve on the basis of a heat absorber temperature Te that is the temperature of the heat absorber and a target heat absorber temperature TEO that is a target value of the temperature, and shifts to the heat absorber temperature control mode, when the heat absorber temperature Te falls below the predetermined temperature which is lower than the target heat absorber temperature TEO in the state where the valve position of the outdoor expansion valve is maximized, and in this heat absorber temperature control mode, the control device maximizes the valve position of the outdoor expansion valve, controls the operation of the compressor on the basis of the heat absorber temperature Te and the target heat absorber temperature TEO, and controls the heat generation of the auxiliary heating device on the basis of a target radiator temperature TCO that is a target value of a temperature of the radiator.

The vehicle air conditioner of the invention of claim 4 is characterized in that in the invention of claim 2 or claim 3, the control device shifts to the heat absorber temperature control mode, when the temperature of the heat absorber falls below the predetermined temperature, and the state continues for a predetermined time in the state where the valve position of the outdoor expansion valve is maximized in the normal mode.

The vehicle air conditioner of the invention of claim 5 is characterized in that in the above respective inventions, the control device returns to the normal mode, when the radiator pressure PCI that is the pressure of the radiator is in excess of a predetermined pressure in the heat absorber temperature control mode.

The vehicle air conditioner of the invention of claim 6 is characterized in that in the above invention, the control device returns to the normal mode, when the radiator pressure PCI is in excess of the predetermined pressure which is higher than the target radiator pressure PCO that is the target value of the pressure and the state continues for a predetermined time in the heat absorber temperature control mode.

The vehicle air conditioner of the invention of claim 7 is characterized in that in the above respective inventions, the auxiliary heating device is disposed on a downstream side of the radiator to the flow of the air of the air in the air flow passage.

The vehicle air conditioner of the invention of claim 8 is characterized in that in the above respective inventions, an evaporation pressure adjustment valve is not disposed on a refrigerant outlet side of the heat absorber.

Effect of the Invention

According to the present invention, a vehicle air conditioner includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior to let the refrigerant absorb heat, an outdoor expansion valve to decompress the refrigerant flowing into this outdoor heat exchanger, a bypass circuit connected in parallel with a series circuit of the outdoor heat exchanger and the outdoor expansion valve, an indoor expansion valve to decompress the refrigerant flowing into the heat absorber, an auxiliary heating device to heat the air to be supplied from the air flow passage to the vehicle interior, and a control device, so that this control device lets the refrigerant discharged from the compressor radiate heat in the radiator, distributes the refrigerant from which the heat has been radiated, lets a part of the refrigerant flow into the heat absorber from the bypass circuit through the indoor expansion valve, lets the refrigerant absorb heat in the heat absorber, lets the residual refrigerant flow into the outdoor heat exchanger through the outdoor expansion valve, and lets the refrigerant absorb heat in the outdoor heat exchanger to execute dehumidifying and heating of the vehicle interior. In the vehicle air conditioner, when the control device executes a normal mode to control an operation of the compressor on the basis of a pressure of the radiator and control a valve position of the outdoor expansion valve on the basis of a temperature of a heat absorber, and when the valve position of the outdoor expansion valve is maximized but the temperature of the heat absorber falls, the control device shifts to a heat absorber temperature control mode to control the operation of the compressor on the basis of the temperature of the heat absorber and generate heat from the auxiliary heating device. Consequently, when the temperature fall of the heat absorber cannot be obstructed in accordance with the valve position of the outdoor expansion valve in the normal mode due to fall of an outdoor air temperature, or the like, the control device shifts to the heat absorber temperature control mode to control the operation of the compressor, thereby controlling the temperature of the heat absorber, and it is possible to prevent temperature fall of the heat absorber.

On the other hand, when the control device controls the operation of the compressor in accordance with the temperature of the heat absorber, a temperature of the radiator cannot be controlled, but the heat is generated from the auxiliary heating device, so that it is also possible to maintain a temperature of the air to be blown out to the vehicle interior. In consequence, an evaporation pressure adjustment valve which has heretofore been disposed on a refrigerant outlet side of the heat absorber can be removed as in the invention of claim 8, and hence, comfortable dehumidifying and heating of the vehicle interior is achievable while achieving cost reduction.

In this case, as in the invention of claim 2, the control device shifts to the heat absorber temperature control mode, when the temperature of the heat absorber falls below a predetermined temperature in a state where the valve position of the outdoor expansion valve is maximized in the normal mode. Consequently, the controller can accurately grasp that the temperature fall of the heat absorber cannot be obstructed by the outdoor expansion valve, to smoothly shift to the heat absorber temperature control mode.

Furthermore, as in the invention of claim 3, in the normal mode, the control device controls the operation of the compressor on the basis of a radiator pressure PCI that is the pressure of the radiator and a target radiator pressure PCO that is a target value of the pressure, controls the valve position of the outdoor expansion valve on the basis of a heat absorber temperature Te that is the temperature of the heat absorber and a target heat absorber temperature TEO that is a target value of the temperature, and shifts to the heat absorber temperature control mode when the heat absorber temperature Te falls below the predetermined temperature which is lower than the target heat absorber temperature TEO in the state where the valve position of the outdoor expansion valve is maximized. Consequently, the controller can accurately grasp that the temperature fall of the heat absorber cannot be obstructed by the outdoor expansion valve, to shift to the heat absorber temperature control mode. Additionally, in this heat absorber temperature control mode, the control device maximizes the valve position of the outdoor expansion valve, controls the operation of the compressor on the basis of the heat absorber temperature Te and the target heat absorber temperature TEO, and controls the heat generation of the auxiliary heating device on the basis of a target radiator temperature TCO that is a target value of the temperature of the radiator. Consequently, it is possible to accurately control the temperature of the air to be blown out to the vehicle interior in the heat absorber temperature control mode, and more comfortable dehumidifying and heating of the vehicle interior are achievable.

In addition, as in the invention of claim 4, the control device shifts to the heat absorber temperature control mode, when the temperature of the heat absorber falls below the predetermined temperature, and the state continues for a predetermined time in the state where the valve position of the outdoor expansion valve is maximized in the normal mode. Consequently, there is eliminated the problem that the control device shifts to the heat absorber temperature control mode due to temporary disturbance, or the like. In consequence, frequent occurrence of mode change is eliminated, and a stable dehumidifying and heating mode is achievable.

Here, as in the invention of claim 5, the control device returns to the normal mode, when the radiator pressure PCI that is the pressure of the radiator is in excess of a predetermined pressure in the heat absorber temperature control mode. Consequently, when the radiator pressure PCI rises due to rise of the outdoor air temperature, or the like, the control device returns to the normal mode from the heat absorber temperature control mode, and it is possible to smoothly return to the temperature control of the heat absorber by the outdoor expansion valve.

Also in this case, as in the invention of claim 6, the control device returns to the normal mode, when the radiator pressure PCI is in excess of the predetermined pressure which is higher than the target radiator pressure PCO that is the target value of the pressure and the state continues for a predetermined time in the heat absorber temperature control mode. Consequently, there is eliminated the problem that the control device returns to the normal mode due to the temporary disturbance, or the like. In consequence, the frequent occurrence of the mode change can similarly be eliminated, the control device accurately returns to the normal mode from the heat absorber temperature control mode, and the stable dehumidifying and heating mode is achievable.

Furthermore, as in the invention of claim 7, the auxiliary heating device is disposed on a downstream side of the radiator to the flow of the air in the air flow passage. Consequently, there is eliminated the disadvantage that heat from the air warmed by the auxiliary heating device is taken in the radiator. In consequence, deterioration of an operation efficiency is avoidable in advance.

MODE FOR CARRYING OUT THE INVENTION

Hereinafter, description will be made as to embodiments of the present invention in detail with reference to the drawings.

Figure 1:
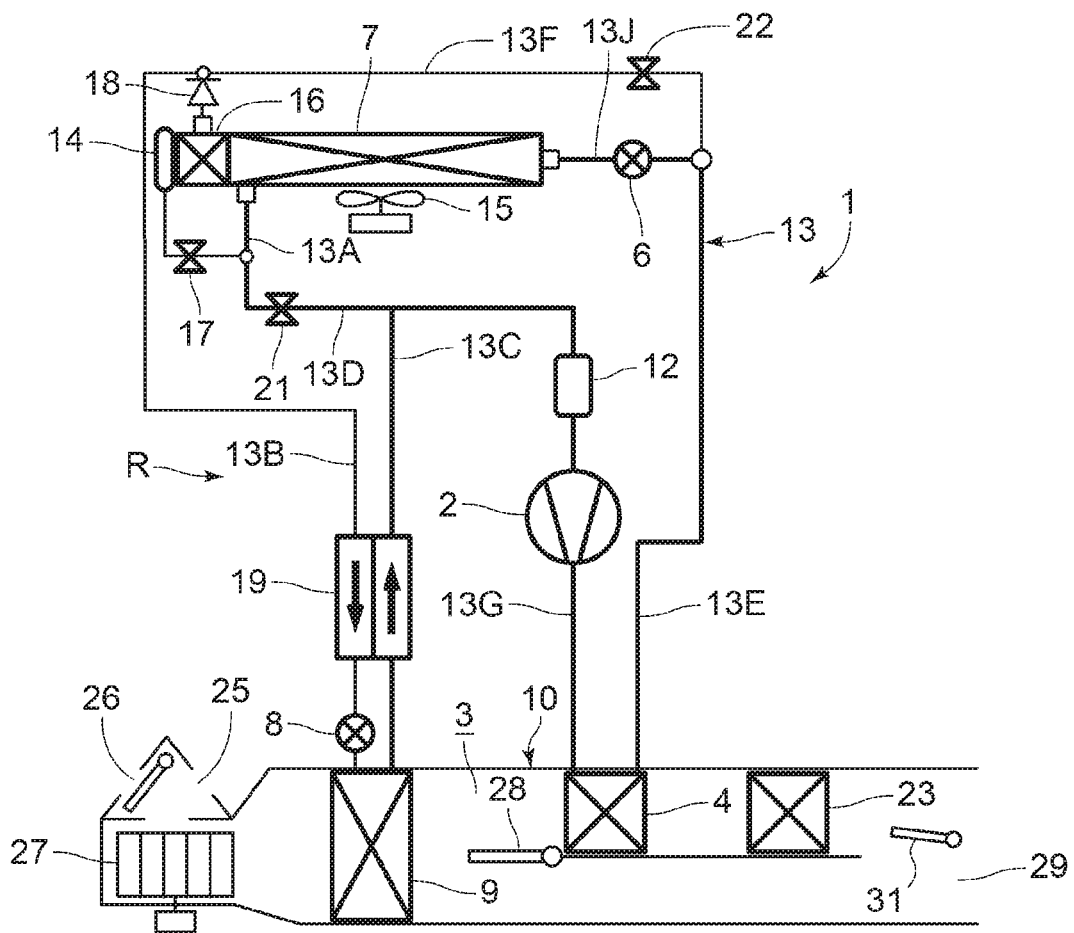
FIG. 1 is a constitutional view of a vehicle air conditioner of an embodiment to which the present invention is applied.

FIG. 1 shows a constitutional view of a vehicle air conditioner 1 of an embodiment of the present invention. A vehicle of the embodiment to which the present invention is applied is an electric vehicle (EV) in which an engine (an internal combustion engine) is not mounted, and runs with an electric motor for running which is driven by power charged in a battery (which is not shown in the drawing), and the vehicle air conditioner 1 of the present invention is also driven by the power of the battery. Specifically, in the electric vehicle which is not capable of performing heating by engine waste heat, the vehicle air conditioner 1 of the embodiment performs a heating mode by a heat pump operation in which a refrigerant circuit is used, and furthermore, the conditioner selectively executes respective operation modes of a dehumidifying and heating mode, an internal cycle mode, a dehumidifying and cooling mode, and a cooling mode.

It is to be noted that the vehicle is not limited to the electric vehicle, and the present invention is also effective for a so-called hybrid car in which the engine is used together with the electric motor for running. Furthermore, needless to say, the present invention is also applicable to a usual car which runs with the engine.

The vehicle air conditioner 1 of the embodiment performs air conditioning (heating, cooling, dehumidifying, and ventilation) of a vehicle interior of the electric vehicle, and there are successively connected, by a refrigerant pipe 13, an electric type of compressor 2 to compress a refrigerant, a radiator 4 disposed in an air flow passage 3 of an HVAC unit 10 in which vehicle interior air passes and circulates, to let the high-temperature high-pressure refrigerant discharged from the compressor 2 and flowing inside via a refrigerant pipe 13G radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electric valve to decompress and expand the refrigerant, a heat absorber 9 disposed in the air flow passage 3 to let the refrigerant absorb heat from interior and exterior of the vehicle during the cooling and during the dehumidifying, an accumulator 12, and others, thereby constituting a refrigerant circuit R.

It is to be noted that an outdoor blower 15 is provided in the outdoor heat exchanger 7. The outdoor blower 15 forcibly passes the outdoor air through the outdoor heat exchanger 7 to perform the heat exchange between the outdoor air and the refrigerant, whereby the outdoor air passes through the outdoor heat exchanger 7 also during stopping of the vehicle (i.e., a velocity is 0 km/h).

Furthermore, the outdoor heat exchanger 7 has a receiver drier portion 14 and a subcooling portion 16 successively on a refrigerant downstream side, a refrigerant pipe 13A connected to a refrigerant outlet of the outdoor heat exchanger 7 is connected to the receiver drier portion 14 via a solenoid valve 17 (an opening/closing valve) to be opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

Additionally, a refrigerant pipe 13B between the check valve 18 and the indoor expansion valve 8 is disposed in a heat exchange relation with a refrigerant pipe 13C positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9.

In addition, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve 21 (an opening/closing valve) to be opened during the heating. The refrigerant pipe 13C is connected to the accumulator 12 and the accumulator 12 is connected to a refrigerant suction side of the compressor 2.

Furthermore, a refrigerant pipe 13E on an outlet side of the radiator 4 branches to a refrigerant pipe 13J and a refrigerant pipe 13F before the outdoor expansion valve 6, and one branching refrigerant pipe 13J is connected to a refrigerant inlet of the outdoor heat exchanger 7 via the outdoor expansion valve 6. Additionally, the other branching refrigerant pipe 13F communicates and connects with the refrigerant pipe 13B on a downstream side of the check valve 18 via a solenoid valve 22 (an opening/closing valve) to be opened during the dehumidifying. Consequently, the refrigerant pipe 13F is connected in parallel with a series circuit of the outdoor expansion valve 6 and the outdoor heat exchanger 7, to form a bypass circuit in the present invention. The solenoid valve 22 is connected to the middle of the bypass circuit (the refrigerant pipe 13F).

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor or outdoor air to the air flow passage 3.

Furthermore, in FIG. 1, 23 denotes an auxiliary heater as an auxiliary heating device disposed in the vehicle air conditioner 1 of the embodiment. The auxiliary heater 23 is constituted of a PTC heater (an electric heater) in the embodiment, and disposed in the air flow passage 3 on an air downstream side of the radiator 4 to the flow of the air in the air flow passage 3. Then, when the auxiliary heater 23 is energized to generate heat, the auxiliary heater becomes a so-called heater core to complement heating of the vehicle interior. When the auxiliary heater 23 is disposed on the downstream side of the radiator 4 to the flow of the air in the air flow passage 3, there is eliminated the disadvantage that heat from the air warmed by the auxiliary heater 23 is taken in the radiator 4. Consequently, deterioration of an operation efficiency of the vehicle air conditioner 1 is avoidable in advance.

Additionally, in the air flow passage 3 on the air upstream side of the radiator 4, an air mix damper 28 is disposed to adjust a ratio at which the air in the air flow passage 3 (the indoor or outdoor air) flowing into the air flow passage 3 and passed through the heat absorber 9 is to be passed through the radiator 4. Furthermore, in the air flow passage 3 on the air downstream side of the auxiliary heater 23, there is formed each outlet (represented by an outlet 29 in FIG. 1) of foot, vent or defroster, and in the outlet 29, an outlet changing damper 31 is disposed to execute changing control of blowing of the air from each outlet mentioned above.

Figure 2:
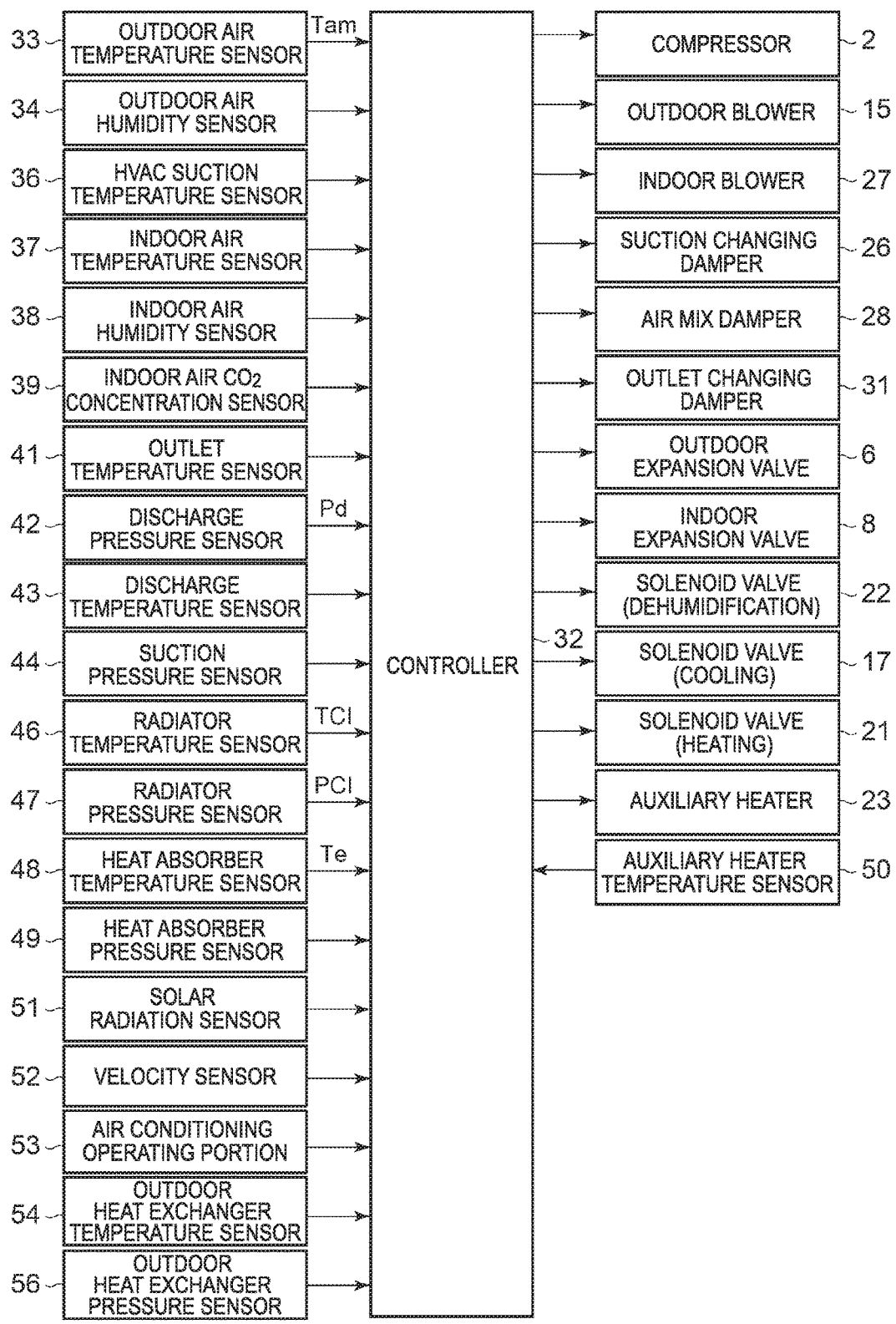
FIG. 2 is a block diagram of an electric circuit of a controller of the vehicle air conditioner of FIG. 1.

Next, in FIG. 2, 32 is a controller (ECU) that is a control device. The controller 32 is constituted of a microcomputer that is an example of a computer including a processor, and an input of the controller is connected to respective outputs of an outdoor air temperature sensor 33 which detects an outdoor air temperature (Tam) of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a pressure (a discharge pressure Pd) of the refrigerant discharged from the compressor 2, a discharge temperature sensor 43 which detects a temperature of the refrigerant discharged from the compressor 2, a suction pressure sensor 44 which detects a pressure of the refrigerant to be sucked into the compressor 2, a radiator temperature sensor 46 which detects a temperature of the radiator 4 (the temperature of the air passed through the radiator 4 or the temperature of the radiator 4 itself: a radiator temperature TCI), a radiator pressure sensor 47 which detects a refrigerant pressure of the radiator 4 (the pressure of the refrigerant in the radiator 4 or immediately after the refrigerant flows out from the radiator 4: a radiator pressure PCI), a heat absorber temperature sensor 48 which detects a temperature of the heat absorber 9 (the temperature of the air passed through the heat absorber 9 or the temperature of the heat absorber 9 itself: a heat absorber temperature Te), a heat absorber pressure sensor 49 which detects a refrigerant pressure of the heat absorber 9 (the pressure of the refrigerant in the heat absorber 9 or immediately after the refrigerant flows out from the heat absorber 9), a solar radiation sensor 51 of, e.g., a photo sensor system to detect a solar radiation amount into the vehicle, a velocity sensor 52 to detect a moving speed (a velocity) of the vehicle, an air conditioning operating portion 53 to set the changing of a predetermined temperature or the operation mode, an outdoor heat exchanger temperature sensor 54 which detects a temperature of the outdoor heat exchanger 7 (the temperature of the refrigerant immediately after the refrigerant flows out from the outdoor heat exchanger 7, or the temperature of the outdoor heat exchanger 7 itself), and an outdoor heat exchanger pressure sensor 56 which detects a refrigerant pressure of the outdoor heat exchanger 7 (the pressure of the refrigerant in the outdoor heat exchanger 7 or immediately after the refrigerant flows out from the outdoor heat exchanger 7).

Furthermore, the input of the controller 32 is further connected to an output of an auxiliary heater temperature sensor 50 which detects a temperature of the auxiliary heater 23 (the temperature of the air passed through the auxiliary heater 23 or the temperature of the auxiliary heater 23: an auxiliary heater temperature TSH).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves of the solenoid valve 22 (dehumidification), the solenoid valve 17 (cooling) and the solenoid valve 21 (heating), and the auxiliary heater 23. Then, the controller 32 controls these components on the basis of the outputs of the respective sensors and the setting input by the air conditioning operating portion 53.

Next, an operation of the vehicle air conditioner 1 of the embodiment having the above constitution will be described. In the embodiment, the controller 32 changes and executes the respective operation modes of the heating mode, the dehumidifying and heating mode, the internal cycle mode, the dehumidifying and cooling mode, and the cooling mode. Description will initially be made as to a flow of the refrigerant in each operation mode.

(1) Flow of Refrigerant of Heating Mode

When the heating mode is selected by the controller 32 (an automatic mode) or a manual operation to the air conditioning operating portion 53 (a manual mode), the controller 32 opens the solenoid valve 21 (for the heating) and closes the solenoid valve 17. The controller also closes the solenoid valve 22.

Then, the controller operates the compressor 2 and the respective blowers 15 and 27, and the air mix damper 28 has a state of passing the air blown out from the indoor blower 27 through the radiator 4 and the auxiliary heater 23. In consequence, a high-temperature high-pressure gas refrigerant discharged from the compressor 2 flows into the radiator 4. The air in the air flow passage 3 passes through the radiator 4, and hence the air in the air flow passage 3 heats by the high-temperature refrigerant in the radiator 4 (by the radiator 4 and the auxiliary heater 23 when the auxiliary heater 23 operates). On the other hand, the refrigerant in the radiator 4 has the heat taken by the air and is cooled to condense and liquefy.

The refrigerant liquefied in the radiator 4 flows out from the radiator 4 and then flows through the refrigerant pipes 13E and 13J to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15. In other words, the refrigerant circuit R functions as a heat pump. Then, the low-temperature refrigerant flowing out from the outdoor heat exchanger 7 flows through the refrigerant pipe 13A, the solenoid valve 21, and the refrigerant pipe 13D, and flows from the refrigerant pipe 13C into the accumulator 12 to perform gas-liquid separation, and the gas refrigerant is sucked into the compressor 2, thereby repeating this circulation. The air heated in the radiator 4 is blown out from the outlet 29 through the auxiliary heater 23, thereby performing the heating of the vehicle interior.

The controller 32 calculates a target radiator pressure PCO (a target value of the pressure PCI of the radiator 4) from a target radiator temperature TCO (a target value of the temperature TCI of the radiator 4) calculated from an after-mentioned target outlet temperature TAO, and controls a number of revolution of the compressor 2 on the basis of the target radiator pressure PCO and the refrigerant pressure of the radiator 4 which is detected by the radiator pressure sensor 47 (the radiator pressure PCI that is a high pressure of the refrigerant circuit R). Furthermore, the controller controls a valve position of the outdoor expansion valve 6 on the basis of the temperature (the radiator temperature TCI) of the radiator 4 which is detected by the radiator temperature sensor 46 and the radiator pressure PCI detected by the radiator pressure sensor 47, and controls a subcool degree of the refrigerant in an outlet of the radiator 4. The target radiator temperature TCO is basically TCO=TAO, but a predetermined limit of controlling is provided.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, this part of the refrigerant flows through the solenoid valve 22 into the refrigerant pipe 13F and flows from the refrigerant pipe 13B through the internal heat exchanger 19 into the indoor expansion valve 8, and the residual refrigerant flows through the outdoor expansion valve 6. That is, the distributed part of the refrigerant is decompressed in the indoor expansion valve 8, and then flows into the heat absorber 9 to evaporate.

The controller 32 controls the valve position of the indoor expansion valve 8 to maintain a superheat degree (SH) in an outlet of the heat absorber 9 at a predetermined value, but water in the air blown out from the indoor blower 27 coagulates to adhere to the heat absorber 9 by a heat absorbing operation of the refrigerant which occurs in the heat absorber 9 at this time, and hence, the air is cooled and dehumidified. The distributed residual refrigerant flowing into the refrigerant pipe 13J is decompressed in the outdoor expansion valve 6, and then evaporates in the outdoor heat exchanger 7.

The refrigerant evaporated in the heat absorber 9 flows through the internal heat exchanger 19 to join the refrigerant (the refrigerant from the outdoor heat exchanger 7) from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4 (the radiator 4 and the auxiliary heater 23 when the auxiliary heater 23 generates heat), thereby performing the dehumidifying and heating of the vehicle interior.

The controller 32 controls the number of revolution of the compressor 2 on the basis of the target radiator pressure PCO calculated from the target radiator temperature TCO and the radiator pressure PCI detected by the radiator pressure sensor 47 (the high pressure of the refrigerant circuit R), and the controller controls the valve position of the outdoor expansion valve 6 on the basis of the temperature (the heat absorber temperature Te) of the heat absorber 9 which is detected by the heat absorber temperature sensor 48. Description will be made later as to control of the compressor 2, the outdoor expansion valve 6 and the auxiliary heater 23 in this dehumidifying and heating mode.

(3) Flow of Refrigerant of Internal Cycle Mode

Next, in the internal cycle mode, the controller 32 shuts off the outdoor expansion valve 6 in the above state of the dehumidifying and heating mode (a shutoff position), and also closes the solenoid valve 21. Specifically, this internal cycle mode is a state where the outdoor expansion valve 6 shuts off under the control of the outdoor expansion valve 6 in the dehumidifying and heating mode, and hence, in the present invention, this internal cycle mode is grasped as a part of the dehumidifying and heating mode.

However, the outdoor expansion valve 6 and the solenoid valve 21 are closed, thereby obstructing inflow of the refrigerant into the outdoor heat exchanger 7 and outflow of the refrigerant from the outdoor heat exchanger 7, and hence, all the condensed refrigerant flowing through the radiator 4 and the refrigerant pipe 13E flows through the solenoid valve 22 to the refrigerant pipe 13F. Then, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 flows through the internal heat exchanger 19 in the refrigerant pipe 13C and flows through the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence, the heat is not pumped up from the outdoor air, but the heating capability for a consumed power of the compressor 2 is exerted. The whole amount of the refrigerant flows through the heat absorber 9 which exerts a dehumidifying operation, and hence, as compared with the above dehumidifying and heating mode, a dehumidifying capability is higher, but the heating capability lowers.

The controller 32 controls the number of revolution of the compressor 2 on the basis of the temperature of the heat absorber 9 or the above-mentioned radiator pressure PCI (the high pressure of the refrigerant circuit R). At this time, the controller 32 selects a smaller compressor target number of revolution from compressor target numbers of revolution obtainable by calculations from the temperature of the heat absorber 9 and the radiator pressure PCI, to control the compressor 2.

(4) Flow of Refrigerant of Dehumidifying and Cooling Mode

Next, in the dehumidifying and cooling mode, the controller 32 opens the solenoid valve 17 and closes the solenoid valve 21. The controller also closes the solenoid valve 22. Then, the controller operates the compressor 2 and the respective blowers 15 and 27, and the air mix damper 28 has the state of passing the air blown out from the indoor blower 27 through the radiator 4. Consequently, the high-temperature high-pressure gas refrigerant discharged from the compressor 2 flows into the radiator 4. The air in the air flow passage 3 passes through the radiator 4, and hence, the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 flows through the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior.

The controller 32 controls the number of revolution of the compressor 2 on the basis of the temperature (the heat absorber temperature Te) of the heat absorber 9 which is detected by the heat absorber temperature sensor 48, also controls the valve position of the outdoor expansion valve 6 on the basis of the above-mentioned high pressure of the refrigerant circuit R, and controls the refrigerant pressure (the radiator pressure PCI) of the radiator 4.

(5) Flow of Refrigerant of Cooling Mode

Next, in the cooling mode, the controller 32 fully opens the valve position of the outdoor expansion valve 6 in the above state of the dehumidifying and cooling mode. It is to be noted that the air mix damper 28 has a state where the air does not pass through the radiator 4. However, even when the air slightly passes, there are not any problems. In consequence, the high-temperature high-pressure gas refrigerant discharged from the compressor 2 flows into the radiator 4. The air in the air flow passage 3 is not passed through the radiator 4, the refrigerant therefore only passes the radiator, and the refrigerant flowing out from the radiator 4 flows through the refrigerant pipe 13E to reach the outdoor expansion valve 6. At this time, the outdoor expansion valve 6 is fully opened, and hence, the refrigerant flows through the outdoor expansion valve 6 to pass the refrigerant pipe 13J, and flows into the outdoor heat exchanger 7 as it is, in which the refrigerant is cooled by the running therein or the outdoor air to pass through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled.

The refrigerant evaporated in the heat absorber 9 flows through the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4, but is blown out from the outlet 29 to the vehicle interior, thereby performing the cooling of the vehicle interior. In this cooling mode, the controller 32 controls the number of revolution of the compressor 2 on the basis of the temperature (the heat absorber temperature Te) of the heat absorber 9 which is detected by the heat absorber temperature sensor 48.

(6) Changing of Operation Mode

The controller 32 calculates the above-mentioned target outlet temperature TAO from Equation (I) mentioned below. The target outlet temperature TAO is a target value of the temperature of the air to be blown out from the outlet 29 to the vehicle interior.

$$TAO=(Tset-Tin)\times K+Tbal(f(Tset,SUN,Tam)) \quad (I),$$

in which Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and the outdoor air temperature Tam detected by the outdoor air temperature sensor 33. Furthermore, in general, the lower the outdoor air temperature Tam is, the higher the target outlet temperature TAO becomes, and the higher the outdoor air temperature Tam is, the lower the target outlet temperature becomes.

Then, the controller 32 selects any operation mode from the above respective operation modes on the basis of the outdoor air temperature Tam detected by the outdoor air temperature sensor 33 and the target outlet temperature TAO on startup. Furthermore, after the startup, the controller selects and changes the above respective operation modes in accordance with changes of environments and setting conditions such as the outdoor air temperature Tam and the target outlet temperature TAO.

(7) Auxiliary Heating by Auxiliary Heater

Furthermore, when the controller 32 judges that the heating capability by the radiator 4 runs short in the heating mode, the controller energizes the auxiliary heater 23 to generate heat, thereby executing the heating by the auxiliary heater 23. When the auxiliary heater 23 generates heat, the auxiliary heater 23 further heats the air in the air flow passage 3 which passes the radiator 4.

Consequently, when the heating capability to be generated by the radiator 4 runs short to the required heating capability (calculated from a difference between the target radiator temperature TCO obtainable from the target outlet temperature TAO and the heat absorber temperature Te), the auxiliary heater 23 complements this shortage of the heating capability. It is to be noted that this auxiliary heater is also energized in the dehumidifying and heating mode according to the present invention, and this will be described later in detail.

(8) Control of Compressor 2, Outdoor Expansion Valve 6 and Auxiliary Heater 23 in Dehumidifying and Heating Mode Next, description will be made as to a compressor number of revolution NC of the compressor 2, the valve position of the outdoor expansion valve 6, and energization control of the auxiliary heater 23 in the above-mentioned dehumidifying and heating mode with reference to FIG. 3 to FIG. 7. The controller 32 changes and executes a normal mode and a heat absorber temperature control mode in this dehumidifying and heating mode according to the present invention.

(8-1) Normal Mode

Figure 3:
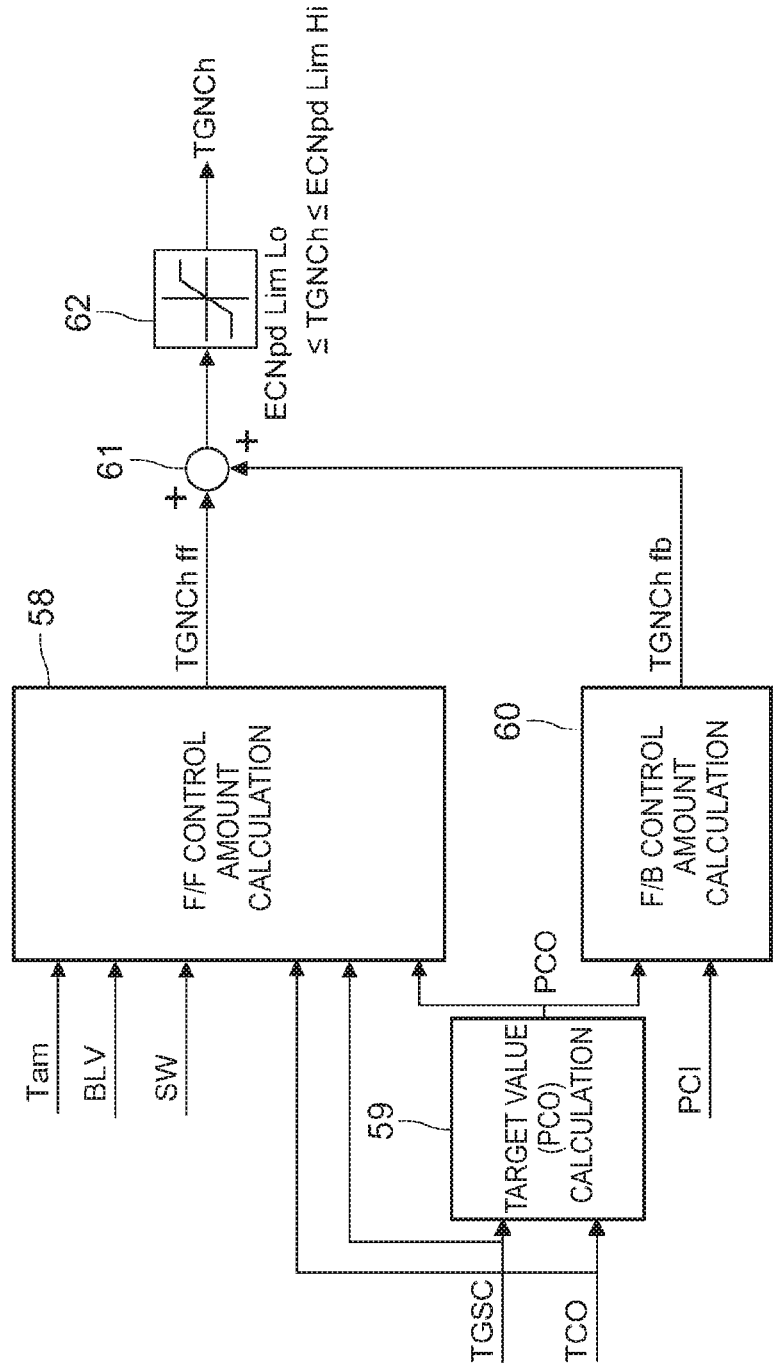
FIG. 3 is a control block diagram concerning compressor control of the controller of FIG. 2.
Figure 4:
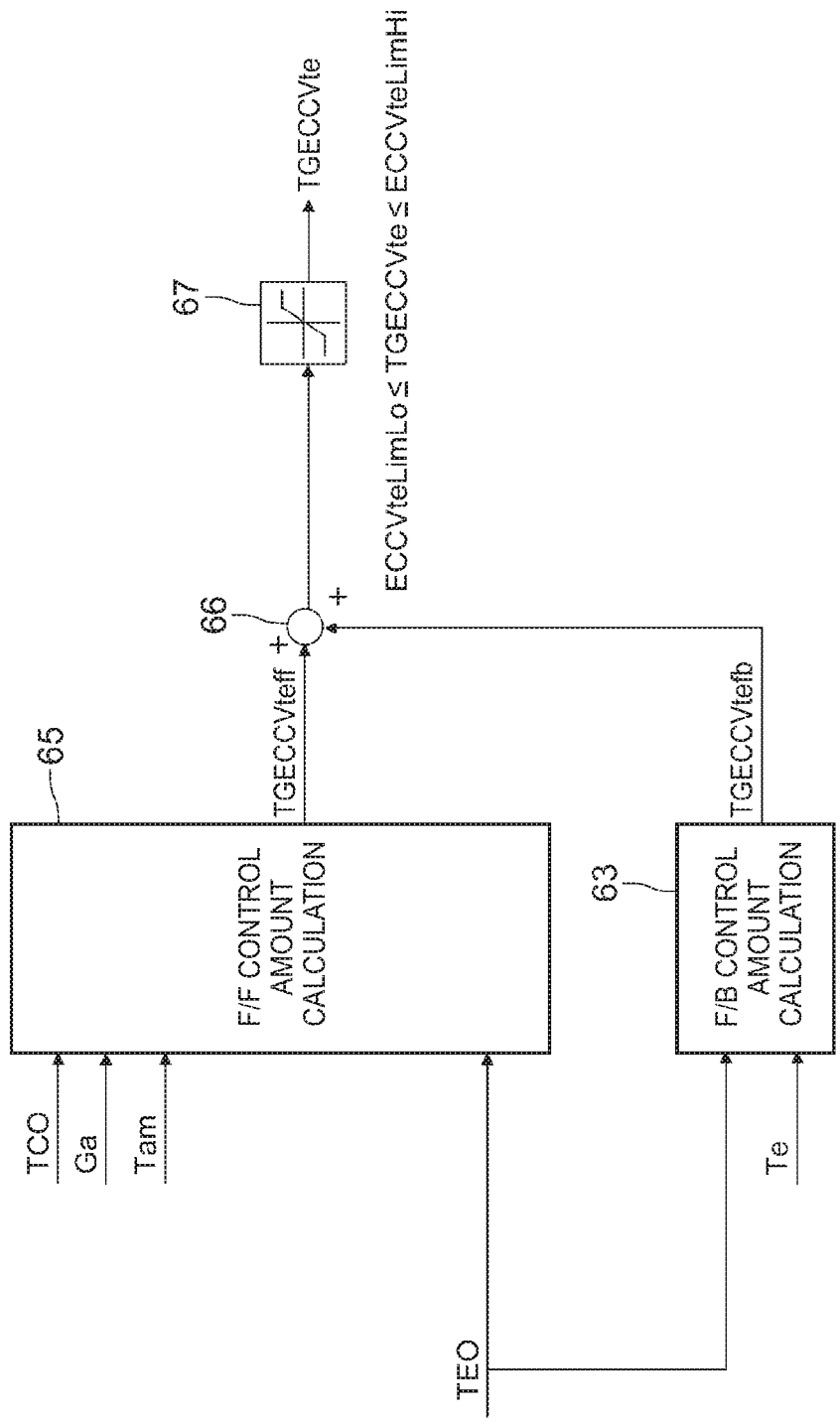
FIG. 4 is a control block diagram concerning outdoor expansion valve control of the controller of FIG. 2.

Each of FIG. 3 and FIG. 4 shows a control block diagram of the compressor 2 and the outdoor expansion valve 6 in this normal mode. FIG. 3 is a control block diagram of the controller 32 which determines a target number of revolution (a compressor target number of revolution) TGNCh of the compressor 2 of the normal mode in the dehumidifying and heating mode (this also applies to the heating mode). An F/F (feedforward) control amount calculation section 58 of the controller 32 calculates an F/F control amount TGNChff of the compressor target number of revolution on the basis of the outdoor air temperature Tam obtainable from the outdoor air temperature sensor 33, a blower voltage BLV of the indoor blower 27, an air mix damper position SW of the air mix damper 28 which is obtainable from SW=(TAO−Te)/(TCI−Te), a target subcool degree TGSC that is a target value of a subcool degree SC in the outlet of the radiator 4, the target radiator temperature TCO that is the target value of the temperature of the radiator 4, and the target radiator pressure PCO that is the target value of the pressure of the radiator 4.

It is to be noted that the air mix damper position SW changes in a range of $0 \leq SW \leq 1$, 0 indicates an air mix shutoff state where the air does not pass through the radiator 4 and the auxiliary heater 23, and 1 indicates an air mix fully opened state where all the air in the air flow passage 3 passes through the radiator 4 and the auxiliary heater 23.

A target value calculation section 59 calculates the target radiator pressure PCO on the basis of the target subcool degree TGSC and the target radiator temperature TCO. Furthermore, an F/B (feedback) control amount calculation section 60 calculates an F/B control amount TGNChfb of the compressor target number of revolution on the basis of the target radiator pressure PCO and the radiator pressure PCI that is the refrigerant pressure of the radiator 4. Then, an adder 61 adds the F/F control amount TGNChff calculated by the F/F control amount calculation section 58 and the F/B control amount TGNChfb calculated by the F/B control amount calculation section 60, a limit setting section 62 attaches limits of an upper limit of controlling and a lower limit of controlling, and then the compressor target number of revolution TGNCh is determined. In the normal mode of the dehumidifying and heating mode, the controller 32 controls the number of revolution NC of the compressor 2 on the basis of the compressor target number of revolution TGNCh.

That is, in this normal mode, the controller 32 calculates the compressor target number of revolution TGNCh and controls the number of revolution NC of the compressor 2 so that the radiator pressure PCI reaches the target radiator pressure PCO, on the basis of the radiator pressure PCI and the target radiator pressure PCO. Furthermore, in the normal mode, the auxiliary heater 23 is not energized (OFF).

Next, FIG. 4 is a control block diagram of the controller 32 which determines a target position (an outdoor expansion valve target position) TGECCVte of the outdoor expansion valve 6 in the normal mode of the dehumidifying and heating mode. An F/F control amount calculation section 65 of the controller 32 calculates an F/F control amount TGEC-CVteff of the outdoor expansion valve target position on the basis of the target heat absorber temperature TEO of the heat absorber 9, the target radiator temperature TCO, a mass air volume Ga of the air, and the outdoor air temperature Tam.

Furthermore, an F/B control amount calculation section 63 calculates an F/B control amount TGECCVtefb of the outdoor expansion valve target position on the basis of the target heat absorber temperature TEO and the heat absorber temperature Te. Then, an adder 66 adds the F/F control amount TGECCVteff calculated by the F/F control amount calculation section 65 and the F/B control amount TGEC-CVtefb calculated by the F/B control amount calculation section 63, a limit setting section 67 attaches limits of an upper limit of controlling and a lower limit of controlling, and then the outdoor expansion valve target position TGEC-CVte is determined. In the normal mode of the dehumidifying and heating mode, the controller 32 controls the valve position of the outdoor expansion valve 6 on the basis of the outdoor expansion valve target position TGECCVte.

That is, in this normal mode, the controller 32 calculates the outdoor expansion valve target position TGECCVte and controls the valve position of the outdoor expansion valve 6 so that the heat absorber temperature Te reaches the target heat absorber temperature TEO, on the basis of the heat absorber temperature Te and the target heat absorber temperature TEO. In this case, when the heat absorber temperature Te is higher than the target heat absorber temperature TEO, the outdoor expansion valve target position TGEC-CVte reduces, and the valve position of the outdoor expansion valve 6 reduces to increase an amount of the refrigerant to flow into the heat absorber 9 through the refrigerant pipes 13F and 13B. Conversely, when the heat absorber temperature Te is lower than the target heat absorber temperature TEO, the outdoor expansion valve target position TGEC-CVte enlarges, and the valve position of the outdoor expansion valve 6 expands to decrease the amount of the refrigerant to flow into the heat absorber 9.

Thus, in the normal mode of the dehumidifying and heating mode, as the heat absorber temperature Te falls below the target heat absorber temperature TEO, the controller 32 enlarges the outdoor expansion valve target position TGECCVte, expands the valve position of the outdoor expansion valve 6, and decreases the amount of the refrigerant to flow into the heat absorber 9 through the refrigerant pipes 13F and 13B. However, for example, when the outdoor air temperature falls, the temperature of the air to flow into the heat absorber 9 also falls. Therefore, even when the valve position of the outdoor expansion valve 6 is maximized (a maximum position of controlling), the temperature of the heat absorber 9 (the heat absorber temperature Te) falls below the target heat absorber temperature TEO.

Figure 6:
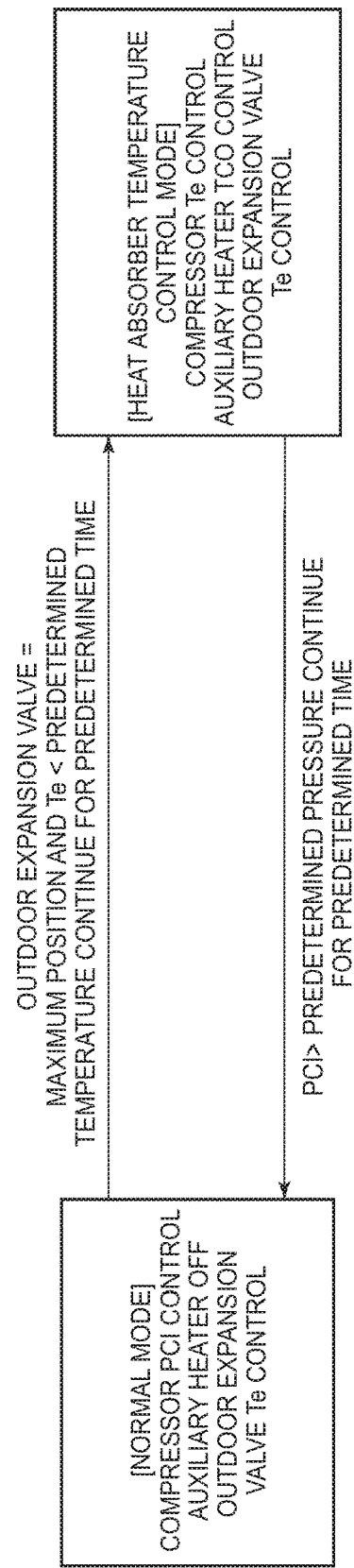
FIG. 6 is a diagram to explain change control of a normal mode and a heat absorber temperature control mode in a dehumidifying and heating mode by the controller of FIG. 2.
Figure 7:
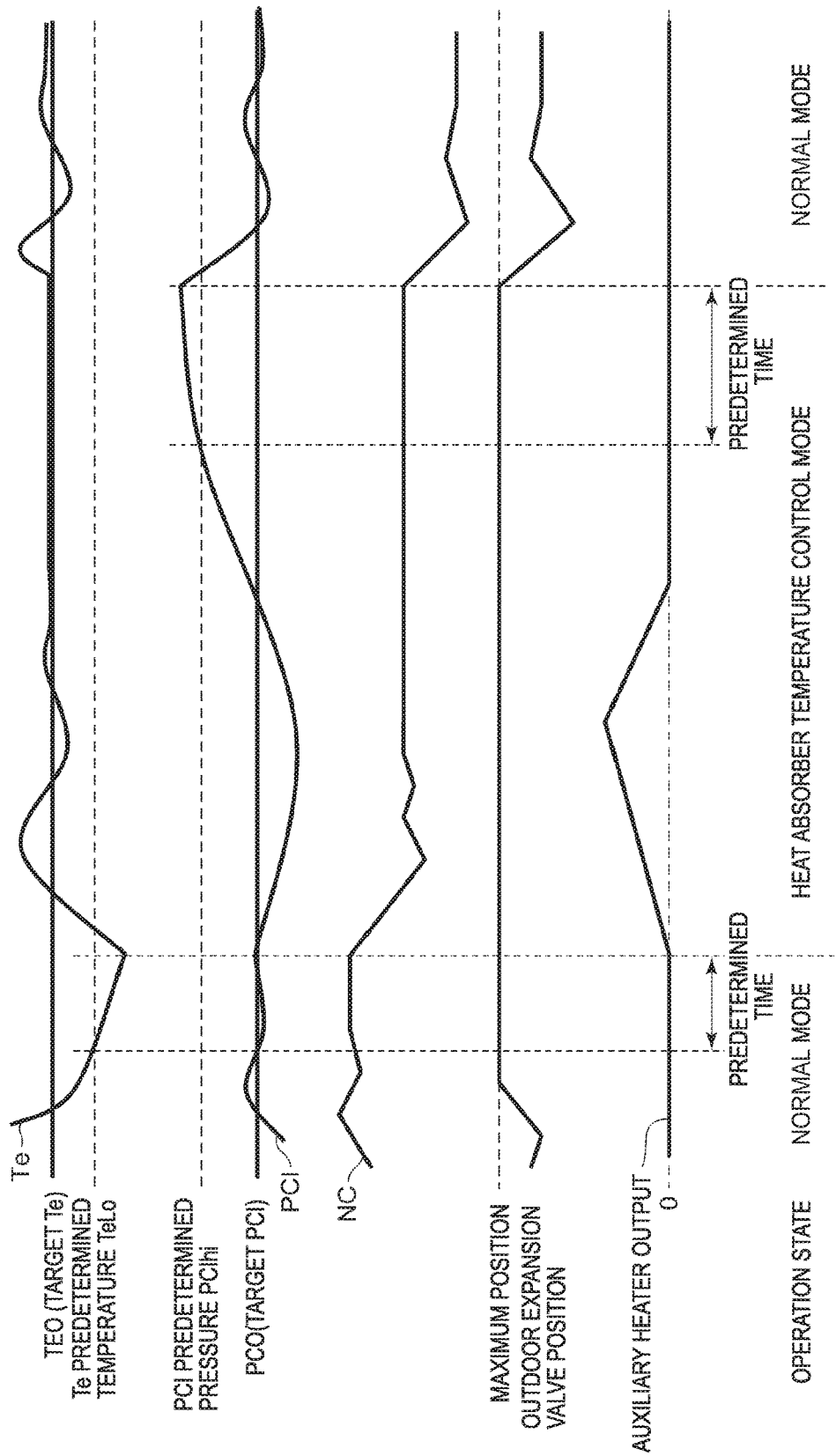
FIG. 7 is a timing chart to explain each temperature or pressure, and operations of a compressor, an outdoor expansion valve and an auxiliary heater in the dehumidifying and heating mode by the controller of FIG. 2.

FIG. 7 shows this behavior at its left end. In the normal mode, the controller 32 shifts to the heat absorber temperature control mode, when the heat absorber temperature Te falls even in a state where the valve position of the outdoor expansion valve 6 is adjusted to the maximum position of controlling, the temperature falls below a predetermined temperature Telo which is lower than the target heat absorber temperature TEO and this state continues for a predetermined time (FIG. 6).

(8-2) Heat Absorber Temperature Control Mode

Figure 5:
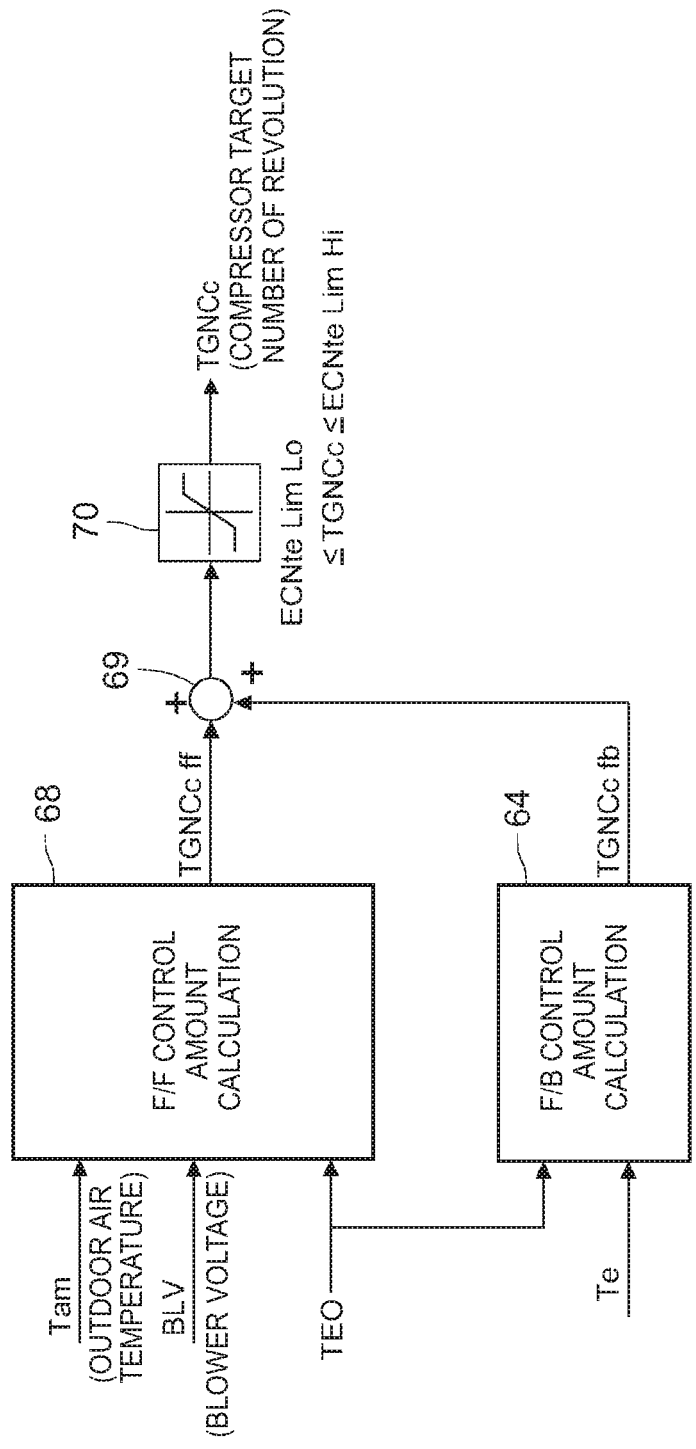
FIG. 5 is another control block diagram concerning the compressor control of the controller of FIG. 2.

FIG. 5 is a control block diagram of the controller 32 which determines a target number of revolution (a compressor target number of revolution) TGNCc of the compressor 2 in this heat absorber temperature control mode. An F/F control amount calculation section 68 of the controller 32 calculates an F/F control amount TGNCcff of the compressor target number of revolution on the basis of the outdoor air temperature Tam, the blower voltage BLV, and the target heat absorber temperature TEO that is the target value of the temperature of the heat absorber 9.

Furthermore, an F/B control amount calculation section 64 calculates an F/B control amount TGNCcfb of the compressor target number of revolution on the basis of the target heat absorber temperature TEO and the heat absorber temperature Te. Then, an adder 69 adds the F/F control amount TGNCcff calculated by the F/F control amount calculation section 68 and the F/B control amount TGNCcfb calculated by the F/B control amount calculation section 64, a limit setting section 70 attaches limits of an upper limit of controlling and a lower limit of controlling, and then the compressor target number of revolution TGNCc is determined. In the heat absorber temperature control mode, the controller 32 controls the number of revolution of the compressor 2 on the basis of the compressor target number of revolution TGNCc.

That is, in this heat absorber temperature control mode, the controller 32 calculates the compressor target number of revolution TGNCc and controls the number of revolution NC of the compressor 2 so that the heat absorber temperature Te reaches the target heat absorber temperature TEO, on the basis of the heat absorber temperature Te and the target heat absorber temperature TEO (see the heat absorber temperature control mode in FIG. 7). It is to be noted that the controller 32 maintains the valve position of the outdoor expansion valve 6 at the maximum position of controlling.

Furthermore, in this way, the controller 32 controls the number of revolution NC of the compressor 2 on the basis of the heat absorber temperature Te, and hence, the pressure of the radiator 4 (the radiator pressure PCI) takes its own course. Therefore, in the heat absorber temperature control mode, the controller 32 energizes the auxiliary heater 23 to generate heat. In consequence, the air passed through the radiator 4 is heated by the auxiliary heater 23, and then flows toward the outlet 29.

Additionally, the controller 32 controls the energization of the auxiliary heater 23 on the basis of the target radiator temperature TCO (=the target outlet temperature TAO) which is the target value of the temperature of the air flowing toward the outlet 29. That is, the controller 32 controls the energization to the auxiliary heater 23 on the basis of the auxiliary heater temperature TSH detected by the auxiliary heater temperature sensor 50 and the target radiator temperature TCO, thereby controlling the heat generation of the auxiliary heater 23 so that the auxiliary heater temperature TSH reaches the target radiator temperature TCO. In consequence, the temperature of the air to be blown out from the outlet 29 to the vehicle interior is prevented from falling.

(8-3) Return to Normal Mode

In this heat absorber temperature control mode, when the outdoor air temperature rises, the radiator pressure PCI also rises. During execution of the heat absorber temperature control mode, the controller 32 returns to the above-mentioned normal mode (FIG. 6), when the radiator pressure PCI detected by the radiator pressure sensor 47 rises above a predetermined pressure PCIhi which is higher than the target radiator pressure PCO and this state continues for a predetermined time (see FIG. 7).

As described above, in the dehumidifying and heating mode, when the controller 32 executes the normal mode to control the operation of the compressor 2 on the basis of the radiator pressure PCI and control the valve position of the outdoor expansion valve 6 on the basis of the heat absorber temperature Te and when the heat absorber temperature Te falls even in the state where the valve position of the outdoor expansion valve 6 is adjusted to the maximum position, the controller shifts to the heat absorber temperature control mode to control the operation of the compressor 2 on the basis of the heat absorber temperature Te and generate heat from the auxiliary heater 23. Therefore, when the temperature fall of the heat absorber 9 cannot be obstructed at the valve position of the outdoor expansion valve 6 in the normal mode due to the fall of the outdoor air temperature, or the like, the controller shifts to the heat absorber temperature control mode to control the heat absorber temperature Te by the operation control of the compressor 2, and it is possible to prevent the temperature fall of the heat absorber 9.

On the other hand, when the operation of the compressor 2 is controlled in accordance with the heat absorber temperature Te, the radiator pressure PCI cannot be controlled, but when the auxiliary heater 23 generates heat, it is also possible to maintain the temperature of the air to be blown out to the vehicle interior. Consequently, it is possible to remove an evaporation pressure adjustment valve which has heretofore been disposed on the refrigerant outlet side of the heat absorber 9, and comfortable dehumidifying and heating of the vehicle interior are achievable while achieving cost reduction.

In this case, the controller 32 shifts to the heat absorber temperature control mode, when the heat absorber temperature Te falls below the predetermined temperature Telo in the state where the valve position of the outdoor expansion valve 6 is the maximum position in the normal mode. Consequently, the controller can accurately grasp that the temperature fall of the heat absorber 9 cannot be obstructed by the outdoor expansion valve 6, to smoothly shift to the heat absorber temperature control mode.

Furthermore, in the normal mode, the controller 32 controls the operation of the compressor 2 on the basis of the radiator pressure PCI and the target radiator pressure PCO, and controls the valve position of the outdoor expansion valve 6 on the basis of the heat absorber temperature Te and the target heat absorber temperature TEO. Additionally, when the heat absorber temperature Te falls below the predetermined temperature Telo which is lower than the target heat absorber temperature TEO in the state where the valve position of the outdoor expansion valve 6 is the maximum position, the controller shifts to the heat absorber temperature control mode. Consequently, the controller can accurately grasp that the temperature fall of the heat absorber 9 cannot be obstructed by the outdoor expansion valve 6, to shift to the heat absorber temperature control mode.

Additionally, in the heat absorber temperature control mode, the controller 32 adjusts the valve position of the outdoor expansion valve 6 to the maximum position of controlling, controls the operation of the compressor 2 on the basis of the heat absorber temperature Te and the target heat absorber temperature TEO, and controls the heat generation of the auxiliary heater 23 on the basis of the target radiator temperature TCO. Consequently, in the heat absorber temperature control mode, it is possible to accurately control the temperature of the air to be blown out to the vehicle interior, and more comfortable dehumidifying and heating of the vehicle interior are achievable.

Furthermore, according to the embodiment, the controller 32 shifts to the heat absorber temperature control mode, when the heat absorber temperature Te falls below the predetermined temperature Telo in the state where the valve position of the outdoor expansion valve 6 is the maximum position in the normal mode, and this state continues for a predetermined time. Consequently, there is eliminated the problem that the controller shifts to the heat absorber temperature control mode due to temporary disturbance, or the like. In consequence, frequent occurrence of mode change can be eliminated, and a stable dehumidifying and heating mode is achievable.

Here, the controller 32 returns to the normal mode, when the radiator pressure PCI is in excess of the predetermined pressure PCIhi in the heat absorber temperature control mode. Consequently, when the radiator pressure PCI rises due to the rise of the outdoor air temperature, or the like, the controller can return to the normal mode from the heat absorber temperature control mode, and can smoothly return to the temperature control of the heat absorber 9 by the outdoor expansion valve 6.

Also in this case, the controller 32 returns to the normal mode, when the radiator pressure PCI is in excess of the predetermined pressure PCIhi which is higher than the target radiator pressure PCO in the heat absorber temperature control mode, and this state continues for a predetermined time. Consequently, there is eliminated the problem that the controller returns to the normal mode due to the temporary disturbance, or the like. In consequence, the frequent occurrence of the mode change can similarly be eliminated, it is possible to accurately return to the normal mode from the heat absorber temperature control mode, and the stable dehumidifying and heating mode is achievable.

It is to be noted that the constitution of the refrigerant circuit R described above in each embodiment does not restrict the present invention, and is changeable without departing from the gist of the present invention.

DESCRIPTION OF REFERENCE NUMERALS 1 vehicle air conditioner
2 compressor
3 air flow passage
4 radiator
6 outdoor expansion valve
7 outdoor heat exchanger
8 indoor expansion valve
9 heat absorber
13F refrigerant pipe (a bypass circuit)
22 solenoid valve (an opening/closing valve)
23 auxiliary heater (an auxiliary heating device)
27 indoor blower (a blower fan)
28 air mix damper
32 controller (a control device)
R refrigerant circuit

The invention claimed is:

1. A vehicle air conditioner comprising:
a compressor to compress a refrigerant,
an air flow passage through which air to be supplied to a vehicle interior flows,
a radiator to let the refrigerant radiate heat, thereby heating the air to be supplied from the air flow passage to the vehicle interior,
a heat absorber to let the refrigerant absorb heat, thereby cooling the air to be supplied from the air flow passage to the vehicle interior,
an outdoor heat exchanger disposed outside the vehicle interior to let the refrigerant absorb heat,
an outdoor expansion valve to decompress the refrigerant flowing into the outdoor heat exchanger,
a bypass circuit connected in parallel with a series circuit of the outdoor heat exchanger and the outdoor expansion valve,
an indoor expansion valve to decompress the refrigerant flowing into the heat absorber,
an auxiliary heating device to heat the air to be supplied from the air flow passage to the vehicle interior, and
a control device,
so that the control device lets the refrigerant discharged from the compressor radiate heat in the radiator, distributes the refrigerant from which the heat has been radiated, lets a part of the refrigerant flow into the heat absorber from the bypass circuit through the indoor expansion valve, lets the refrigerant absorb heat in the heat absorber, lets the residual refrigerant flow into the outdoor heat exchanger through the outdoor expansion valve, and lets the refrigerant absorb heat in the outdoor heat exchanger to execute dehumidifying and heating of the vehicle interior,
wherein the control device executes a normal mode to control an operation of the compressor on the basis of a pressure of the radiator and control a valve position of the outdoor expansion valve on the basis of a temperature of the heat absorber, and
in the normal mode, when the valve position of the outdoor expansion valve is maximized but the temperature of the heat absorber falls, the control device shifts to a heat absorber temperature control mode to control the operation of the compressor on the basis of the temperature of the heat absorber and generate heat from the auxiliary heating device.

2. The vehicle air conditioner according to claim 1, wherein the control device shifts to the heat absorber temperature control mode, when the temperature of the heat absorber falls below a predetermined temperature in a state where the valve position of the outdoor expansion valve is maximized in the normal mode.

3. The vehicle air conditioner according to claim 2, wherein in the normal mode, the control device controls the operation of the compressor on the basis of a radiator pressure PCI that is the pressure of the radiator and a target radiator pressure PCO that is a target value of the pressure, controls the valve position of the outdoor expansion valve on the basis of a heat absorber temperature Te that is the temperature of the heat absorber and a target heat absorber temperature TEO that is a target value of the temperature, and
shifts to the heat absorber temperature control mode, when the heat absorber temperature Te falls below the predetermined temperature which is lower than the target heat absorber temperature TEO in the state where the valve position of the outdoor expansion valve is maximized, and
in the heat absorber temperature control mode, the control device maximizes the valve position of the outdoor expansion valve, controls the operation of the compressor on the basis of the heat absorber temperature Te and the target heat absorber temperature TEO, and controls the heat generation of the auxiliary heating device on the basis of a target radiator temperature TCO that is a target value of a temperature of the radiator.

4. The vehicle air conditioner according to claim 2, wherein the control device shifts to the heat absorber temperature control mode, when the temperature of the heat absorber falls below the predetermined temperature, and the state continues for a predetermined time in the state where the valve position of the outdoor expansion valve is maximized in the normal mode.

5. The vehicle air conditioner according to claim 1, wherein the control device returns to the normal mode, when the radiator pressure PCI that is the pressure of the radiator is in excess of a predetermined pressure in the heat absorber temperature control mode.

6. The vehicle air conditioner according to claim 5, wherein the control device returns to the normal mode, when the radiator pressure PCI is in excess of the predetermined pressure which is higher than the target radiator pressure PCO that is the target value of the pressure and the state continues for a predetermined time in the heat absorber temperature control mode.

7. The vehicle air conditioner according to claim 1, wherein the auxiliary heating device is disposed on a downstream side of the radiator to the flow of the air in the air flow passage.

8. The vehicle air conditioner according to claim 1, wherein an evaporation pressure adjustment valve is not disposed on a refrigerant outlet side of the heat absorber.

\* \* \* \* \*